(12) United States Patent
Hamburg

(10) Patent No.: US 6,269,196 B1
(45) Date of Patent: Jul. 31, 2001

(54) IMAGE BLENDING WITH INTERPOLATED TRANSFER MODES INCLUDING A NORMAL TRANSFER MODE

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/336,074

(22) Filed: Jun. 18, 1999

Related U.S. Application Data

(62) Division of application No. 09/008,269, filed on Jan. 16, 1998, now abandoned.

(51) Int. Cl.[7] .................................................. G06K 9/36
(52) U.S. Cl. ........................................... 382/284; 345/435
(58) Field of Search .................................... 382/284, 167; 345/435; 358/450, 518

(56) References Cited

U.S. PATENT DOCUMENTS

| | | | |
|---|---|---|---|
| 5,379,129 | * | 1/1995 | Othmer et al. ..................... 358/450 |
| 5,555,107 | * | 9/1996 | Funada et al. ..................... 358/518 |
| 5,638,501 | * | 6/1997 | Gougu et al. ...................... 395/135 |
| 5,651,107 | * | 7/1997 | Frank et al. ....................... 395/344 |
| 5,724,158 | * | 3/1998 | Kolke ................................. 358/462 |
| 5,874,967 | * | 2/1999 | West et al. ......................... 345/435 |

OTHER PUBLICATIONS

Blinn, James F. "Compositing, Part I: Theory", IEEE Computer Graphics and Applications, pp. 83–87.*

\* cited by examiner

*Primary Examiner*—Yon J. Couso
(74) *Attorney, Agent, or Firm*—Fish & Richardson P.C.

(57) ABSTRACT

Methods and apparatus implementing a technique for blending image layer data. A definition of a first layer of an image includes a solidity parameter beta, in the range zero to one inclusive, and a transfer mode having a transfer mode function T2. The first layer is blended with a second layer using a blending function T satisfying $$T=normal(\text{lower, upper}) \times beta + T2(\text{lower, upper}) \times (1-beta).$$

16 Claims, 1 Drawing Sheet

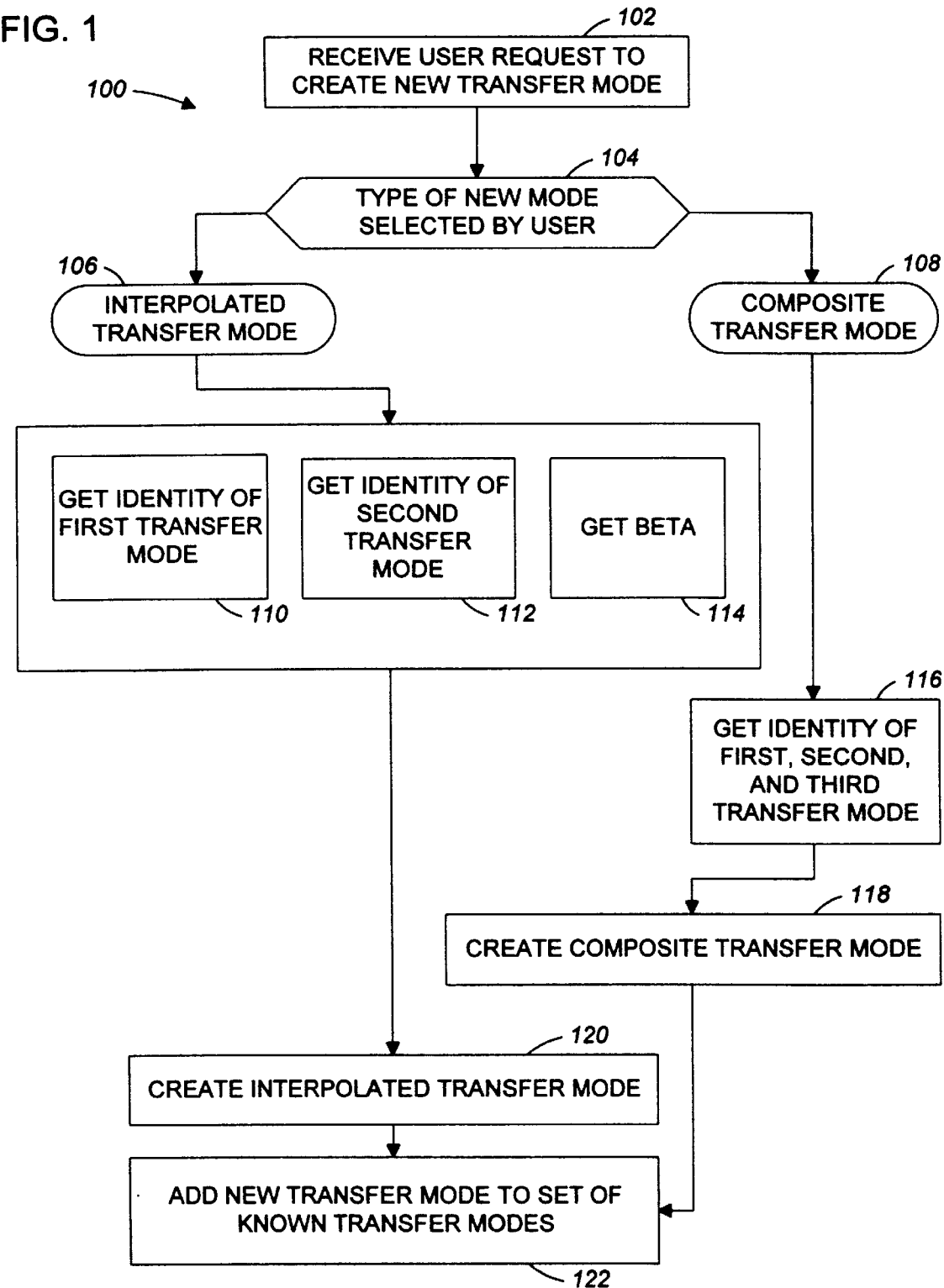

IMAGE BLENDING WITH INTERPOLATED TRANSFER MODES INCLUDING A NORMAL TRANSFER MODE

CROSS REFERENCE TO RELATED APPLICATIONS

This is a divisional of U.S. application Ser. No. 09/008,269, filed Jan. 16, 1998, now abandoned, the disclosure of which is incorporated herein by reference.

BACKGROUND OF THE INVENTION

The present invention is generally related to graphical image manipulation systems, and more particularly to a method for compositing multiple graphical images.

Many graphical image manipulation computer programs, such as Adobe® Photoshopg®4.0, from Adobe Systems Incorporated, of San Jose, Calif., build a final image by compositing several image layers together. The image layers may be thought of as stacked sheets of acetate. The density of the ink on the acetate controls the transparency of the sheet, i.e., the extent to which that sheet obscures the images from the underlying sheets. In the computer program, the color and density of the ink on the acetate sheet are represented by a color value and an opacity (or "alpha") value, respectively.

Each layer typically includes image data, an optional mask, and compositing controls. Typically, the image data is represented by an array of pixels, with each pixel having a color and, optionally, an opacity. Similarly, the mask is represented by an array of pixels, with each pixel having an opacity. Alternatively, the image data or the mask or both can be defined analytically, e.g., by using shape outlines, or by other functions which map positions to color and opacity. In addition, the image data and the mask can be dynamic, i.e., computed from other data at the time the layers are composited.

The compositing controls may include a transfer mode, also known as a blending mode. The transfer mode of an image layer determines how the color in the image layer mixes with the color accumulated from the underlying layers.

Image layers are generally composited in order from bottom to top. The general process for compositing an image layer begins with calculation of any dynamic data in the image layer, such as the color of the pixels in the image and the opacity of the pixels in the mask. Then, the opacity is determined for each pixel from the mask, the global opacity, if any, and the image data. Finally, the color of each pixel in the layer is combined with the color of the corresponding pixel in an accumulation buffer to generate a new composited color. The combination is controlled by the opacity of the pixel and the transfer mode.

Further information on compositing image layers may be found in commonly-owned U.S. patent application Ser. No. 08/703,024 filed Aug. 26, 1996 to Hamburg et al. for Adjustment Layers for Composited Image Manipulation, incorporated here by this reference.

SUMMARY OF THE INVENTION

In general, in one aspect, the invention provides methods and apparatus implementing a technique for blending image layer data. The technique includes receiving a definition of a first layer of an image, the definition including a solidity parameter beta, in the range zero to one inclusive, and a transfer mode, the transfer mode having a transfer mode function T2; and blending the first layer with a second layer using a blending fiction T satisfying the equation T=normal (lower, upper)×beta+T2(lower, upper)×(1−beta). Advantageous implementations of the invention include one or more of the following features. The definition of the first layer includes a mapping data mapping positions in the layer to solidity parameter values beta, and the value of beta used in evaluating T for a position in the layer is found using the mapping data. The mapping data is a mask associated with the first layer. The mapping data is represented analytically. The mapping data is represented in raster form. The position in the layer is a pixel position; and the mask has a bit depth of at least 8 bits.

Among the advantages of the invention are one or more of the following. A user can define new transfer modes without having to write equations. New transfer modes can be created easily. Transfer mode functions can easily be used as generator functions to build an ever increasing set of transfer modes. With the addition of solidity masks, significant new effects become available: for example, blending can be changed by area in a straightforward manner. In addition, solidity masks enable the user to create smooth and subtle transitions from one sort of blending to another.

Other features and advantages of the invention will become apparent from the following description and from the claims.

BRIEF DESCRIPTION OF THE DRAWING

FIG. 1 is a flow diagram a method of creating new transfer mode functions, including interpolated transfer mode functions and composite transfer mode functions, in accordance with the invention.

DETAILED DESCRIPTION

A transfer mode in image compositing is defined by a function that takes a color on one layer and a color on another layer (in the same pixel location) and produces a mixed color. Transfer modes are used in image compositing to combine an accumulated image (lower colors) with a new layer image (upper colors) to produce an image of mixed colors. Image manipulation computer programs, such as Photoshop®, generally provide a wide variety of predefined transfer modes. The basic transfer mode equation is:

new_color=α×T(lower_color, upper_color)+(1−α)× lower _color where α is the opacity of the upper layer, T is the selected transfer mode function, and lower_color and upper_color are the color values of the lower and upper layers at the pixel position of the pixel whose color new_color is being calculated.

Referring to FIG. 1, a method for creating new transfer modes 100 is implemented in an image manipulation program or system to enable a user easily to create new transfer modes based on existing transfer modes and a scalar parameter, as appropriate. Method 100 may be invoked when the system receives an indication that a user wishes to create a new transfer mode, which may be received through a menu or dialog box item selected by use of a graphical user interface implemented on a computer display and a data entry device, such as a mouse or keyboard (step 102). Method 100 may include both a method 106 for creating an interpolated transfer mode and a method 108 for creating a composite transfer mode, as well as a step enabling a user to select the type of the new transfer mode (step 104).

Method 106 creates an interpolated transfer mode function, which will be denoted T, from two given transfer mode functions, which will be denoted T1 and T2. Each transfer mode function has two arguments or inputs, which will be denoted (lower, upper), representing two color operands on which the transfer mode function is performed to yield a color result. The image manipulation system obtains the identity or a definition of T1 (step 110) and of T2 (step 112) and an interpolation factor beta between zero and one (step 114), in any order or at the same time. These may be obtained interactively from a user of the system, for example through a dialog window in a graphical user interface, which enables the user to identify transfer mode functions by selecting transfer modes from a set of known transfer modes. These are then combined to create the new transfer mode by defining the interpolated transfer mode function T (step 120). The new function is defined as a linear interpolation of T1 and T2 with the interpolation factor beta, as follows:

T(lower, upper)=T1(lower, upper)×beta+T2(lower, upper)×(1−beta)

Thus, a user interface through which a user is enabled to create an interpolated transfer mode may be implemented with only three simple controls: two controls to select from a set of known transfer modes and one control to select a value of beta. The value of beta may be presented as a percentage between zero and 100 and it may advantageously be stored as an 8-bit value between zero and 255.

In one special case of the technique of combining transfer mode functions, the function T1 is fixed to provide normal transfer mode, that is, T1 (lower, upper)=upper.

In this case, beta acts as a solidity parameter since it governs the extent to which the resulting transfer mode (function T) provides just the upper color in the mixture of upper and lower colors. This advantageously permits a solidity control to be introduced easily wherever a user may make a transfer mode selection. In fact, the user interface may present this as a distinct feature and simply provide an additional slider or other conventional interface element to enter a single numerical solidity parameter wherever a transfer mode is an available option. For example, a solidity control may readily be added to the transfer mode and opacity controls in a layers palette in Photoshop®.

In another special case of combined transfer modes, an interpolated transfer mode defined with T1 being the normal transfer mode and T2 being the multiply transfer mode (that is, T2(lower, upper)=lower×upper) may advantageously be used to provide a preview display showing how inks of separation plates will behave when an image is printed.

The value of beta can vary spatially, for example, in two dimensions as specified by a user-created or a predefined mask. In this case, step 114 is modified and the system obtains the identity of a beta mask, which may be a layer or a mask in a layer, and uses the corresponding beta mask pixel value in the function definition as the function is applied. By defining a beta mask, a user could control blending of layers on a pixel-by-pixel basis. For the special case described above where beta is a solidity parameter, a system may easily be enhanced to enable a user to add a beta mask to a layer, for example by adding a menu command to the system's user interface for adding a solidity mask, which when added could appear on a layer palette along with other layer components.

The usefulness of such a solidity mask may be seen from the following example. Consider a screen blending mode, defined by T=(upper+lower−upper×lower), which lightens the lower image in the areas where the upper image is fairly light and has no effect in the areas where the upper image is black. Consider an upper image consisting of a design using just black and white. If the design is blended into an image using the screen mode, the white areas make the result white and the black areas are transparent. If the blending mode is normal mode, the design completely replaces the image (that is, both the black and white portions override the underlying image). With a solidity mask, the user can get a combined image where the white portions of the upper image are visible everywhere, but the black portions are only visible in the areas designated as being solid. This creates an interesting fade out effect—different from a traditional opacity-based fade out—because some of the colors fade differently than do others.

Referring again to FIG. 1, method 108 enables a user easily to create a composite transfer mode function, which will again be denoted T, from three given transfer mode functions, which will be denoted T1, T2, and T3. The system obtains the identities of T1, T2, and T3 (step 116). These may be obtained interactively from a user of the system, for example through a dialog window in a graphical user interface, which enables the user to identify transfer mode functions by selecting transfer modes from a set of known transfer modes. These three functions are then combined to define a new transfer mode function T (step 118). The new function is a composite function (in the mathematical sense of composition), as follows:

T(lower, upper)=T3(T1(lower, upper),T2(lower, upper)).

The foregoing definition may be expressed in an abbreviated form as T=T3(T1, T2).

Thus, a user interface through which a user is enabled to create a composite transfer mode may be implemented with only three simple controls, each one enabling the user to select one of a known set of transfer modes. With such a system, a user may easily create a new transfer mode, such as a transfer mode that returns the lighter of the upper color and the absolute value of the difference between the upper and lower colors.

The ability to create composite transfer mode functions makes the function

T(lower, upper)=lower an interesting possible value for T1 or T2 in the definition of a composite transfer mode. For example, such a function can be used to define a new function of the form T(lower, upper)=T3(lower, T2(lower, upper)), which feeds the lower color into both stages of the transfer mode calculation.

Having created a new transfer mode, a system may optionally add the new transfer mode to the set of known transfer modes, thereby enabling an unlimited set of additional transfer modes to be created (step 122).

Transfer mode functions defined using the foregoing techniques can be implemented in a variety of ways. Special cases can be implemented using specialized computer program modules. The general cases can be implemented by programming the system to build data structures representing the newly-defined transfer mode functions and then either (i) using interpreters to walk the data structure representations on a pixel basis (which is expensive) or an area basis, or (ii) using the data structure representations to generate code dynamically that evaluates newly-defined transfer mode functions.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system comprising at least one programmable processor coupled to receive data and instructions from, and to transmit data and instructions to, a data storage system (including volatile and non-volatile memory and/or storage elements), at least one input device, and at least one output device. Each computer program may be implemented in a high-level procedural or object-oriented programming language, or in assembly or machine language, if desired; and in any case, the language may be a compiled or interpreted language. Suitable processors include, by way of example, both general and special purpose microprocessors coupled to a read-only memory and/or a random access memory to receive instructions and data. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims. For example, the order of performing steps of the invention may be changed by those skilled in the art and still achieve desirable results.

What is claimed is:

1. A method operable in a system for processing image data, comprising:

receiving a definition of a first layer of an image, the definition including a solidity parameter beta, in the range zero to one inclusive, and receiving a transfer mode, the transfer mode having a transfer mode function T2; and blending the first layer with a second layer using a blending function T satisfying the equation T=normal(lower, upper)×beta+T2(lower, upper)×(1−beta), where the function T determines how color in the first layer mixes with color in the second layer, the function T taking two color operands and yielding a color result, and where the normal transfer mode function is defined as normal(lower, upper)=upper.

2. The method of claim 1, wherein:

the definition of the first layer includes mapping data mapping positions in the layer to solidity parameter values beta, and the value of beta used in evaluating T for a position in the layer is found using the mapping data.

3. The method of claim 2, wherein:

the mapping data is a mask associated with the first layer.

4. The method of claim 3, wherein:

the position in the layer is a pixel position; and the mask has a bit depth of at least 8 bits.

5. The method of claim 2, wherein:

the mapping data is represented analytically.

6. The method of claim 2, wherein:

the mapping data is represented in raster form.

7. The method of claim 2, wherein:

T2 is defined by T2(lower, upper)=lower×upper.

8. Apparatus comprising a computer-readable storage medium tangibly embodying program instructions for use in a system for processing image data, the program comprising instructions operable for causing a programmable instruction processor to:

receive a definition of a first layer of an image, the definition including a solidity parameter beta, in the range zero to one inclusive;

receive a transfer mode, the transfer mode having a transfer mode function T2; and blend the first layer with a second layer using a blending fiction T satisfying the equation T=normal(lower, upper)×beta+T2(lower, upper)×(1−beta) where the function T determines how color in the first layer mixes with color in the second layer, the function T taking two color operands and yielding a color result, and where the normal transfer mode function is defined as normal(lower, upper)=upper.

9. The apparatus of claim 8, wherein:

the definition of the first layer includes mapping data mapping positions in the layer to solidity parameter values beta, and the value of beta used in evaluating T for a position in the layer is found using the mapping data.

10. The apparatus of claim 9, wherein:

the position in the layer is a pixel position; and the mask has a bit depth of at least 8 bits.

11. The apparatus of claim 9, wherein:

the mapping data is a mask associated with the first layer.

12. The apparatus of claim 9, wherein:

the mapping data is represented analytically.

13. The apparatus of claim 9, wherein:

the mapping data is represented in raster form.

14. The apparatus of claim 9, wherein:

T2 is defined by T2(lower, upper)=lower×upper.

15. The method of claim 1, wherein the solidity parameter beta is a single value that applies to the entire layer.

16. The apparatus of claim 8, wherein the solidity parameter beta is a single value that applies to the entire layer.

* * * * *

UNITED STATES PATENT AND TRADEMARK OFFICE
CERTIFICATE OF CORRECTION

PATENT NO.    : 6,269,196 B1
DATED         : July 31, 2001
INVENTOR(S)   : Mark Hamburg It is certified that error appears in the above-identified patent and that said Letters Patent is hereby corrected as shown below:

<u>Title page,</u>
Item [56], References Cited, OTHER PUBLICATIONS, after "pp. 83-87", please insert --, Sept. 1994 -- therefor.

<u>Column 6,</u>
Line 23, please delete "fiction" and insert -- function -- therefor.

Signed and Sealed this

Twenty-sixth Day of February, 2002

Attest:

JAMES E. ROGAN
Attesting Officer    Director of the United States Patent and Trademark Office